United States Patent [19]

Sekizawa et al.

[11] Patent Number: 4,900,992
[45] Date of Patent: Feb. 13, 1990

[54] APPARATUS AND METHOD FOR CONTROLLING ELECTRIC CAR

[75] Inventors: Toshihiko Sekizawa; Hiroyuki Matsumura; Makoto Yasuda, all of Katsuta, Japan

[73] Assignee: Hitachi, Ltd., Tokyo, Japan

[21] Appl. No.: 293,080

[22] Filed: Jan. 3, 1989

[30] Foreign Application Priority Data

Jan. 6, 1988 [JP] Japan .................................. 63-384

[51] Int. Cl.$^4$ .......................................... H02K 41/00
[52] U.S. Cl. .................................... 318/135; 310/12; 104/292
[58] Field of Search ................... 318/135, 732; 310/12, 310/13; 104/293, 294, 292

[56] References Cited

U.S. PATENT DOCUMENTS

| 4,039,910 | 8/1977 | Chirgwin | 318/807 |
| 4,634,950 | 1/1987 | Klatt | 318/732 |
| 4,793,263 | 12/1988 | Basic et al. | 310/12 |

FOREIGN PATENT DOCUMENTS 61-199404 9/1986 Japan.

Primary Examiner—Patrick R. Salce
Assistant Examiner—Judson H. Jones
Attorney, Agent, or Firm—Antonelli, Terry & Wands

[57] ABSTRACT

A PWM (pulse width modulation) inverter generating an a.c. output having a variable voltage and a variable frequency supplies a.c. power to a linear induction motor. An electric car supported by wheels is driven by a driving torque produced by the linear induction motor. While the electric car is running, the motor torque varies due to various factors among which a variation of the air gap length is representative. The power factor cos φ of the PWM inverter is detected to calculate the motor torque, and the output voltage of the PWM inverter is regulated or mechanical brakes are controlled so as to compensate the torque variation. Thus, the variation of the air gap length, which is representative of the factors giving rise to torque variations and which has been difficult to be detected, can be reliably detected to permit torque control according to the torque variation of the linear induction motor.

18 Claims, 2 Drawing Sheets

APPARATUS AND METHOD FOR CONTROLLING ELECTRIC CAR

BACKGROUND OF THE INVENTION

1. Field of the Invention

This invention relates to improvements in an apparatus and method for controlling an electric car driven by a linear induction motor.

2. Description of the Prior Art

Attention is now directed to a linear-motor electric car in which a primary coil forming a primary side of a linear induction motor is mounted on the electric car, and a reaction plate forming a secondary side of the linear induction motor is laid on the ground. The linear-motor electric car is supported by wheels to which no powering torque is transmitted, and a force propelling the linear-motor electric car is provided by a powering torque produced by the linear induction motor. On the other hand, a force decelerating the linear-motor electric car is provided by the combination of an electrical braking torque produced by the linear induction motor and a mechanical braking torque imparted to the wheels from mechanical brakes. (Pneumatic brakes are commonly used as the mechanical brakes.)

The greatest advantage of this linear-motor electric car is that the dimension between the floor of the electric car and the ground can be made small. This is especially advantageous in that the cross-sectional area of a subway tunnel can be markedly decreased, thereby contributing to realization of a subway car having a very small cross-sectional shape.

The linear induction motor driving the electric car has such an inherent problem that the length of the air gap between its primary and secondary sides varies greatly when the electric car is running. Such a variation of the air gap length impairs the constant torque characteristic demanded for the electric car. With a view to solve such a problem, a method is proposed in JP-A-No. 61-199404. According to the disclosure of the cited publication, a variation of the air gap length between the primary and secondary sides of a linear induction motor is detected so as to correct the slip frequency and motor current of the linear induction motor on the basis of the detected variation of the air gap length.

However, the prior art method for correcting the slip frequency and current of the linear induction motor on the basis of the detected variation of the air gap length has a first and a second problem as described below.

In the first place, it is extremely difficult to accurately detect the variation of the air gap length varying due to many different factors. The following are factors considered to cause variations of the air gap length:

(1) Wear of wheels
(2) Wear of rails
(3) Laying error of reaction plate relative to rails
(4) Distorsion of rails
(5) Deflection of reaction plate due to, for example, attractive force of linear induction motor
(6) Fall of wheels into joint gap between rails
(7) Vibration of body of electric car during running
(8) Others In order to detect all of the causes of variations of the air gap length attributable to these factors, detection of, for example, vertical movement of the truck relative to the rails is not sufficient, and a gap sensor must be mounted on the primary coil provided on the electric car so as to directly detect a variation of the air gap length between the primary coil and the reaction plate laid on the ground. However, the gap sensor presently available cannot be disposed adjacent to the primary coil generating a strong magnetic field and must be disposed at a position considerably distant from the primary coil. Therefore, the above demand cannot be satisfied.

In the second place, in a linear-motor electric car, power is usually supplied from a single power converter to a plurality of linear induction motors, for example, four or eight linear induction motors. Further, each of these linear induction motors has a considerable length in the advancing direction of the electric car. Therefore, unless a variation of the air gap length in each of the linear induction motors is accurately detected, the combined torque of the linear induction motors driving the electric car cannot be accurately controlled. Thus, a plurality of air gap sensors are inevitably required, and, from this aspect too, the prior art method is insufficient in the accuracy and reliability of torque control.

Therefore, the prior art method using the air gap sensor is difficult to compensate torque variations in a linear-motor electric car and has not been put into practical use.

SUMMARY OF THE INVENTION

It is an object of the present invention to provide an apparatus and method for effectively compensating torque variations in an electric car driven by a linear induction motor.

Another object of the present invention is to provide means for effectively compensating an air-gap length variation which is representative of torque variations in an electric car driven by a linear induction motor.

In accordance with the present invention which attains the above objects, there is provided an apparatus for controlling an electric car driven by a linear induction motor, the apparatus comprising means for detecting the power factor of a power converter supplying power to the linear induction motor and means for regulating torque imparted to the electric car on the basis of the detected power factor.

According to one aspect of the present invention, the torque produced by mechanical brakes of the electric car is regulated on the basis of the detected power factor.

According to another aspect of the present invention, the torque produced by the linear induction motor itself is regulated on the basis of the detected power factor.

As described above, the variation of the air gap length in the linear induction motor is representative of the causes of torque variations in the linear-motor electric car. When a reactive power component attributable to the variation of the air gap length is excluded from consideration, the power factor of the power converter supplying power to the linear induction motor represents the proportion of active power acting to produce the torque of the linear induction motor. Therefore, when the torque imparted to the electric car is regulated according to the power factor of the power converter, a torque variation of the linear induction motor due to a variation of the air gap varying with the running of the electric car can be compensated.

When the braking torque of the mechanical brakes of the electric car is regulated according to the power factor of the power converter while the linear induction motor is in its regenerative braking mode, shortage of the electrical (regenerative) braking torque of the linear induction motor can be compensated to secure the safety of the electric car.

On the other hand, when the torque produced by the linear induction motor itself is regulated according to the power factor of the power converter while the linear induction motor is in its powering mode, a torque variation of the linear induction motor due to a variation of the air gap can be compensated to improve the constant torque characteristic of the electric car.

BRIEF DESCRIPTION OF THE DRAWINGS

The above and other objects, features and advantages of the present invention will be described hereinafter with respect to the accompanying claims and drawings, in which like reference numerals are used to describe similar parts throughout the several views of the invention, and wherein:

DESCRIPTION OF THE PREFERRED EMBODIMENT

The present invention will now be described in detail with respect to the accompanying drawings.

Figure 1:
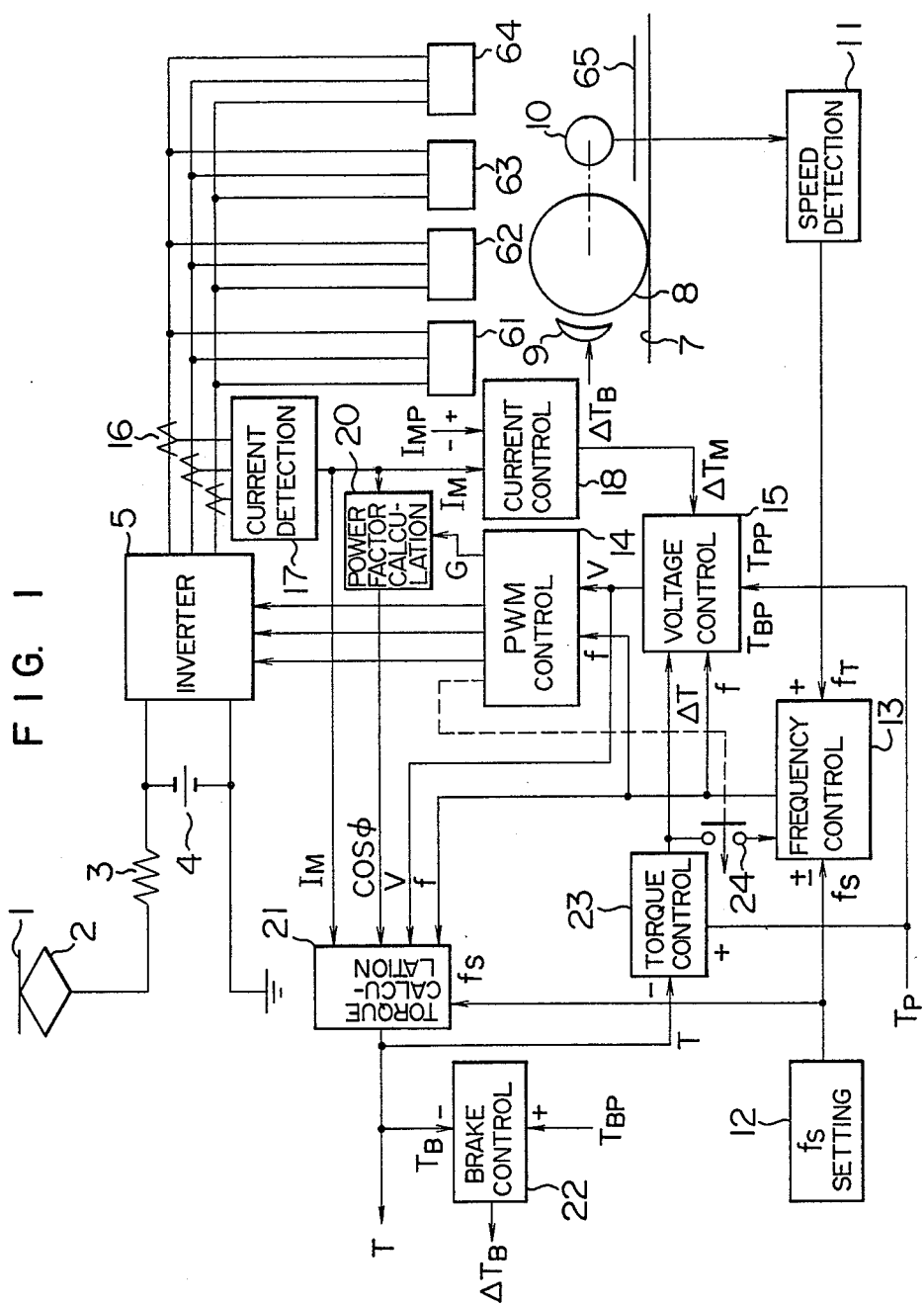
FIG. 1 is a block diagram of a preferred embodiment of the electric car control apparatus according to the present invention.

FIG. 1 is a block diagram of a preferred embodiment of the control apparatus of the present invention for controlling an electric car provided with linear induction motors.

Referring to FIG. 1, d.c. power collected through a pantograph collector 2 of an electric car from an overhead wire 1 connected to a d.c. power source is supplied to an inverter (a power converter) 5 through an inverted L-type filter which includes a filter reactor 3 and a filter capacitor 4. When the overhead wire 1 is connected to an a.c. power source, an a.c.—a.c. converter is used as this power converter 5.

The inverter 5 generates an a.c. output having a variable voltage and a variable frequency, and such an output is supplied in parallel to a plurality of or four linear induction motors 61, 62, 63 and 64.

The electric car is supported by a group of wheels 8 running on rails 7. These wheels 8 are not of the self-propelled type and are decelerated by associated mechanical brakes 9. The electric car is accelerated to run by a propelling force generated between primary coils and reaction plates of the linear induction motors 61 to 64 and is decelerated by a reverse propelling force.

The control apparatus includes a frequency control system and a voltage control system. The structure and function of the frequency control system will now be described.

A pulse generator 10 is mechanically coupled to one of the wheels 8 and is electrically connected to a speed detector 11 which converts the speed frequency into a speed voltage $f_T$. This speed voltage $f_T$ represents the speed of the electric car, and its value can be regarded to correspond to the motor frequency of the linear induction motors 61 to 64. On the other hand, a unit 12 for setting the slip frequency $f_S$ of the linear induction motors 61 to 64 is connected to a frequency controller 13 to which the speed detector 11 is also connected. The frequency controller 13 calculates a frequency command f given by the following equation (1):

$$f = f_T \pm f_S \text{ (1)}$$

where $(f_T + f_S)$ and $(f_T - f_S)$ are used in a power running mode and a regenerative braking mode respectively. This frequency command f is applied as an input to a PWM controller 14 to determine the operation frequency of the inverter 5.

The voltage control system has basically a simple structure and function as described now.

The frequency command f from the frequency controller 13 is also applied as an input to a voltage controller 15. In the voltage controller 15, the frequency command f is converted into a voltage command V which satisfies the ratio V/f=constant between the voltage V and the frequency f, and such a voltage command V is applied as another input to the PWM controller 14.

In response to the application of the frequency command f and the voltage command V, the PWM controller 14 of known structure controls the firing timing of GTO thyristors in the inverter 5.

As a result, the linear induction motors 61 to 64 are ideally placed under a constant torque control mode, since the slip frequency $f_S$ is maintained constant.

A torque command $T_p$ is externally applied as another input to the voltage controller 15. In the power running mode, a torque compensation command $T_{pp}$ representing an output of a unit responsive to the load of the electric car is applied to the voltage controller 15 as the torque command $T_p$, so that the torque produced by the linear induction motors 61 to 64 can be corrected according to the load of the electric car. On the other hand, in the regenerative braking mode, a braking torque command $T_{Bp}$ is applied to the voltage controller 15 as the torque command $T_p$ so that the output voltage of the inverter 5 can be controlled to control the electrical braking torque of the linear induction motors 61 to 64 according to the magnitude of the braking torque required for braking the electric car in that mode. The slip frequency $f_S$ of the linear induction motors 61 to 64 is not regulated for the reason which will now be described. That is, because the speed-torque characteristic curve of a linear induction motor has a small gradient as compared to that of a rotary induction motor, a higher slip frequency $f_F$ is required so as to produce a desired torque. For example, the slip in the linear induction motor is about 15% whereas that in the rotary induction motor is about 3%, and the efficiency of the linear induction motor in such a case becomes as low as about 70% whereas that of the rotary induction motor is about 90%. Therefore, an attempt to increase the torque of the linear induction motor by regulating (increasing) the slip frequency $f_S$ results in an excessively great sacrifice of the efficiency.

Referring to FIG. 1 again, the output current of the inverter 5 is detected by the combination of a current transformer 16 and a current detector 17, and the value of the detected current $I_M$ is compared with a current command $I_{Mp}$ in a current controller 18 connected at its output to the voltage controller 15. When the error $\Delta I_M = I_{mp} - I_M$ becomes excessively large, the output voltage of the inverter 5 is corrected by the voltage controller 15.

When the air gap length D is constant, the torque T produced by the linear induction motors 61 to 64 is given by the following equations (2) and (3). That is, because the air gap length D is constant, the power factor cos φ is substantially constant, and the equations are similar to those of a rotary induction motor:

$$T = K_1 \cdot (V/f) \cdot I_M \quad (2)$$

$$= K_2 \cdot (V/f)^2 \cdot f_{S\,(tm)} \quad (3)$$

Therefore, the torque produced by the linear induction motors 61 to 64 can be calculated on the basis of the combination of the inverter output voltage V, the inverter output frequency f and the motor current $I_M$ shown in the equation (2) or on the basis of the combination of the inverter output voltage V, the inverter output frequency f and the slip frequency $f_S$ shown in the equation (3).

The relation between the air gap length D, the power factor cos φ and the propelling force T will now be described, and the operation of the apparatus shown in FIG. 1 will then be described.

Figure 2:
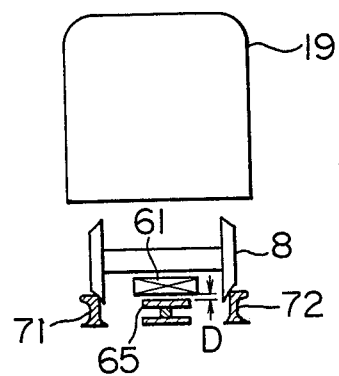
FIG. 2 is a schematic vertical sectional view of the electric car controlled by the apparatus of the present invention.

FIG. 2 is a schematic vertical sectional view of the electric car to which the embodiment of the present invention is applied.

Referring to FIG. 2, the reaction plate 65 is laid intermediate between the rails 71 and 72 disposed on the ground.

The primary coil 61 of the linear induction motor is disposed opposite to the ground-side reaction plate 65 at a lower middle part of the truck (not shown) having the wheels 8 and supporting the body 19 of the electric car.

Figure 3:
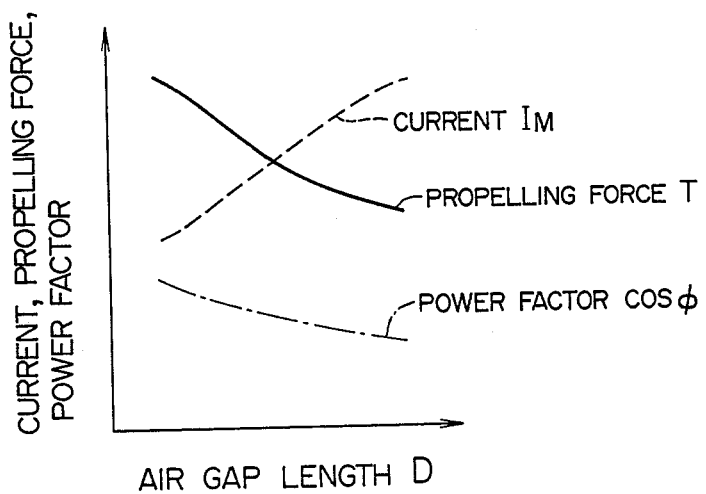
FIG. 3 is a graph showing how the motor current, propelling force and power factor of the linear induction motor vary relative to variations of the air gap length.

FIG. 3 shows how the propelling force T, motor current $I_M$ and power factor cos φ of the linear induction motor vary when a variation occurs in the air gap length D between the primary coil 61 and the reaction plate 65 of the linear induction motor.

As will be apparent from FIG. 3, the propelling force (the torque) T and the power factor cos φ decrease, while the motor current $I_M$ increases, with the increase in the air gap length D. The increase in the motor current $T_M$ is attributable to an increase in the exciting current component (the reactive component).

Returning to FIG. 1, a firing signal G of one of the phases is applied from the PWM controller 14 to a power factor calculator 20, and a corresponding current phase signal of that phase is also applied from the current detector 17 to the power factor calculator 20. Therefore, the power factor calculator 20 can calculate the power factor cos φ on the basis of the difference between the current of one phase and the voltage of that phase.

On the other hand, on the basis of the voltage command V, frequency command f, slip frequency $f_S$, motor current $I_M$, and power factor cos φ applied as inputs, a torque calculator 21 calculates the combined torque T of the linear induction motor group. This combined torque T is calculated according to the following equations:

$$T = K_1 \cdot (V/f) \cdot I_M \cdot \cos \phi \quad (4)$$

$$= K_2 \cdot (V/f)^2 \cdot f_S \cdot \cos \phi \quad (5)$$

As will be apparent from the equations (4) and (5), only one of the motor current $I_M$ and the slip frequency $f_S$ is required for calculating the combined torque T, and both of them need not be applied to the torque calculator 21.

In the regenerative braking mode, the torque calculator 21 calculating the combined torque T of the linear induction motors 61 to 64 generates a signal representing a combined braking torque $T_B$ of the linear induction motors 61 to 64 as its output. This combined braking torque $T_B$ is compared in a brake controller 22 with the braking torque command $T_{Bp}$ commanding the braking torque to be imparted to the electric car in the regenerative braking mode. A signal representing the error $\Delta T_B$ between the combined braking torque $T_B$ and the braking torque command $T_{Bp}$ is transmitted to the mechanical brakes 9, so that the shortage of the electrical braking torque can be compensated by the braking force produced by the mechanical brakes 9.

Thus, even when the braking force may decrease due to a decrease in the power factor of the linear induction motors 61 to 64, the shortage of the braking force can be automatically made up by the braking force produced by the mechanical brakes 9, thereby securing the safety of the electric car.

Further, the detected power factor signal cos φ generated from the power factor calculator 20 can be used to alleviate variations of the combined torque of the linear induction motors themselves regards of whether the operation mode is the power running mode or the regenerative braking mode.

In the illustrated embodiment of the present invention, the detected torque T represented by the output signal of the torque calculator 21 is compared in a torque controller 23 with the torque command $T_p$, and a signal representing the error ΔT therebetween is applied as an input to the voltage controller 15 so as to correct the output voltage of the inverter 5.

However, in lieu of such a method, the power factor signal cos φ generated from the power factor calculator 20 may be directly applied as an input to the voltage controller 15 so as to correct the output voltage of the inverter 5.

In the above description, the output voltage of the inverter 5 is corrected to compensate the torque produced by the linear induction motors 61 to 64. However, the motor current $I_M$ may be corrected for the purpose of torque compensation.

In the illustrated embodiment, the slip frequency $f_S$ is not regulated, but the output voltage of the inverter 5 is regulated. Such a method is employed for the reason similar to that described already, so that the efficiency of the linear induction motors may not be lowered.

The output voltage of the inverter 5 is selected so that it attains a maximum value at a speed considerably lower than the rated speed of the electric car. When the PWM controller 14 detects that the inverter output voltage has attained its predetermined maximum value, the PWM controller 14 acts to turn on a switch 24 through a path as shown by the broken line in FIG. 1. When the switch 24 is turned on, the error output signal ΔT of the torque controller 23 is applied to the frequency controller 13 to correct the frequency. That is, because the correction of the output voltage of the inverter 5 by the voltage control system is not effective any more after the inverter output voltage attains its maximum value, the "frequency control system" is now used to regulate or correct the slip frequency $f_S$ of the linear induction motors 61 to 64.

In the manner described above, variations of the torque of the linear induction motors due to variations of the power factor including a variation of the air gap length can be minimized, so that the torque characteristic of the electric car can be made quite close to the desired constant torque characteristic.

In the aforementioned embodiment of the present invention, the power factor of the power converter is detected by detecting the a.c. output current of the power converter. When an inverter is used as this power converter, its d.c. power input represents active power. In this case, the power factor can be detected by detecting the d.c. power input. Further, those skilled in the art can readily employ any other known means for detecting the power factor of the power converter.

It will be understood from the foregoing detailed description of the present invention that torque variations in an electric can driven by linear induction motors can be effectively compensated.

We claim:

1. An electric car control apparatus comprising:
    a power converter generating an a.c. output having a variable voltage and a variable frequency;
    a linear induction motor to which power is supplied from said power converter;
    an electric car driven by said linear induction motor;
    means for detecting the power factor of said power converter; and
    means for regulating a torque imparted to said electric car on the basis of the detected power factor.

2. An electric car control apparatus according to claim 1, wherein said means for regulating the torque imparted to said electric car includes means for regulating a torque produced by said linear induction motor.

3. An electric car control apparatus according to claim 1, wherein said means for regulating the torque imparted to said electric car includes means for regulating a torque imparted to said electric car from torque producing means other than said linear induction motor.

4. An electric car control apparatus according to claim 3, wherein said torque producing means other than said linear induction motor includes mechanical braking means.

5. An electric car control apparatus according to claim 1, wherein said power factor detecting means includes means for detecting the phase difference between the output voltage and the output current of said power converter.

6. An electric car control apparatus according to claim 1, wherein said power converter includes an inverter, and said power factor detecting means includes means for detecting a d.c. power input applied to said inverter.

7. An electric car control apparatus comprising:
    a power converter generating an a.c. output having a variable voltage and a variable frequency;
    a linear induction motor to which power is supplied from said power converter;
    an electric car driven by said linear induction motor;
    means for detecting the power factor of said power converter;
    means for calculating a torque produced by said linear induction motor is response to the application of a signal representing the detected power factor;
    means for generating a torque command commanding a torque to be imparted to said electric car;
    means for comparing said calculated torque with said torque command thereby generating V an output signal representing the error therebetween; and
    means for regulating the torque imparted to said electric car on the basis of the output signal of said comparing means.

8. An electric car control apparatus according to claim 7, wherein said means for regulating the torque imparted to said electric car includes means for regulating the torque produced by said linear induction motor.

9. An electric car control apparatus according to claim 7, wherein said means for regulating the torque imparted to said electric car includes means for regulating a torque imparted to said electric car from torque producing means other than said linear induction motor.

10. An electric car control apparatus according to claim 9, wherein said torque producing means other than said linear induction motor includes mechanical braking means.

11. An electric car control apparatus according to claim 7, wherein said power factor detecting means includes means for detecting the phase difference between the output voltage and the output current of said power converter.

12. An electric car control apparatus according to claim 7, wherein said power converter includes an inverter, and said power factor detecting means includes means for detecting a d.c. power input applied to said inverter.

13. An electric car control apparatus comprising:
    a power converter generating an a.c. output having a variable voltage and a variable frequency;
    a linear induction motor to which power is supplied from said power converter;
    an electric car driven by said linear induction motor;
    means for setting a slip frequency of said linear induction motor;
    means for detecting the motor frequency of said linear induction motor;
    means for controlling the operating frequency of said power converter in response to the application of a signal representing the detected motor frequency or an equivalent signal together with a signal representing said slip frequency;
    means for controlling the output voltage of said power converter;
    means for detecting the power factor of said power converter; and
    means for correcting a voltage command generated from said voltage control means on the basis of the detected power factor of said power converter.

14. An electric car control apparatus comprising:
    a power converter generating an a.c. output having a variable voltage and a variable frequency;
    a linear induction motor to which power is supplied from said power converter;
    an electric car driven by said linear induction motor;
    means for setting a slip frequency of said linear induction motor;
    means for detecting the motor frequency of said linear induction motor;
    means for controlling the operating frequency of said power converter in response to the application of a signal representing the detected motor frequency or an equivalent signal together with a signal representing said slip frequency;
    means for controlling the output voltage of said power converter;
    means for detecting the power factor of said power converter;

means for correcting a voltage command generated from said voltage control means on the basis of the detected power factor of said power converter;

means for detecting the fact that the output voltage of said power converter has attained a predetermined maximum value; and means responsive to the generation of a corresponding output from said maximum-value detecting means for correcting the output of said frequency control means on the basis of the detected power factor of said power converter.

15. An electric car control apparatus comprising:

a power converter generating an a.c. output having a variable voltage and a variable frequency;

a plurality of linear induction motors to which power is supplied from said power converter;

an electric car driven by said linear induction motors;

means for setting a slip frequency of said linear induction motors;

means for detecting the motor frequency of said linear induction motors;

means for controlling the operating frequency of said power converter by adding or subtracting a signal representing said slip frequency to or from a signal representing said detected motor frequency or an equivalent signal;

means for controlling the output voltage of said power converter so that the converter output voltage becomes proportional to said operating frequency;

means for detecting the phase difference between the output voltage and the output current of said power converter;

means for calculating the combined electrical braking torque of said plural linear induction motors on the basis of signals representing the detected phase difference, the output voltage of said power converter, the operating frequency of said power converter and the slip frequency of said linear induction motors or equivalent signals; and means for controlling mechanical brakes of the electric car on the basis of the difference between said calculated combined electrical braking torque and a desired braking torque to be imparted to the electric car.

16. In an electric car control apparatus including a power converter generating an a.c. output having a variable voltage and a variable frequency, a linear induction motor to which power is supplied from said power converter, and an electric car driven by said linear induction motor, a method of controlling the electric car comprising the steps of:

detecting the phase difference between the voltage and the current of the a.c. output supplied from said power converter to said linear induction motor;

calculating a regenerative braking torque produced by said linear induction motor while taking the detected phase difference into account;

calculating a shortage of the braking torque by comparing the calculated braking torque produced by said linear induction motor with a braking torque command; and transmitting a braking torque command corresponding to the calculated shortage of the braking torque to mechanical brakes of the electric car.

17. In an electric car control apparatus including a power converter generating an a.c. output having a variable voltage and a variable frequency, a linear induction motor to which power is supplied from said power converter, and an electric car driven by said linear induction motor, a method of controlling the electric car comprising the steps of:

detecting the phase difference between the voltage and the current of the a.c. output supplied from said power converter to said linear induction motor;

calculating a variation of a torque produced by said linear induction motor on the basis of the detected phase difference; and regulating the torque produced by said linear induction motor on the basis of the calculated torque variation.

18. An electric car control apparatus comprising:

a power converter generating an a.c. output having a variable voltage and a variable frequency;

a linear induction motor to which power is supplied from said power converter;

an electric car driven by said linear induction motor; and means for detecting the power factor of said power converter.

* * * * *